United States Patent
Koo et al.

(10) Patent No.: US 10,300,392 B2
(45) Date of Patent: May 28, 2019

(54) VIRTUAL GOLF SIMULATION APPARATUS AND METHOD FOR SUPPORTING GENERATION OF VIRTUAL GREEN

(71) Applicant: GOLFZON YUWON HOLDINGS CO., LTD., Daejeon (KR)

(72) Inventors: Gi-won Koo, Seoul (KR); Min-jun Kim, Seoul (KR); Seong-in Cho, Incheon (KR); Sung-young Im, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 824 days.

(21) Appl. No.: 14/375,213

(22) PCT Filed: Jan. 28, 2013

(86) PCT No.: PCT/KR2013/000655
§ 371 (c)(1),
(2) Date: Jul. 29, 2014

(87) PCT Pub. No.: WO2013/115529
PCT Pub. Date: Aug. 8, 2013

(65) Prior Publication Data
US 2015/0011279 A1    Jan. 8, 2015

(30) Foreign Application Priority Data
Jan. 31, 2012   (KR) .................. 10-2012-0009897

(51) Int. Cl.
*A63F 13/573*   (2014.01)
*A63F 13/812*   (2014.01)
(Continued)

(52) U.S. Cl.
CPC .......... *A63F 13/812* (2014.09); *A63F 13/573* (2014.09); *G06T 13/20* (2013.01);
(Continued)

(58) Field of Classification Search
CPC .................. A63F 13/812; A63F 13/573; A63F 2300/1093; A63F 2300/305;
(Continued)

(56) References Cited

U.S. PATENT DOCUMENTS 3,534,961 A * 10/1970 Tiley ..................... A63F 7/0628
273/108.21
3,563,553 A * 2/1971 Baldwin ............ A63B 69/3661
473/164
(Continued)

FOREIGN PATENT DOCUMENTS

CA          2458734 A1    5/2003
JP       H08-071194 A    3/1996
(Continued)

OTHER PUBLICATIONS

Machine translation of WO 2009/145407.*
(Continued)

*Primary Examiner* — David L Lewis
*Assistant Examiner* — Matthew D Hoel
(74) *Attorney, Agent, or Firm* — Korus Patent, LLC; Seong Il Jeong

(57) ABSTRACT

Disclosed herein are a virtual golf simulation apparatus and method. The virtual golf simulation apparatus includes an image processing unit, a manipulation unit, and a green setting unit. The image processing unit provides an image of a basic set green on which a user will perform putting. The manipulation unit provides an interface that enables the user to set the lie of the basic set green. The green setting unit generates a user-set green by processing received setting information via the manipulation unit. The image processing unit provides the image of the user-set green.

18 Claims, 5 Drawing Sheets

(51) Int. Cl.
*G06T 13/20* (2011.01)
*G09B 19/00* (2006.01)

(52) U.S. Cl.
CPC .. *G09B 19/0038* (2013.01); *A63F 2300/1093* (2013.01); *A63F 2300/305* (2013.01); *A63F 2300/646* (2013.01); *A63F 2300/8011* (2013.01)

(58) Field of Classification Search
CPC ....... A63F 2300/646; A63F 2300/8011; G06T 13/20; G09B 19/0038
See application file for complete search history.

(56) References Cited

U.S. PATENT DOCUMENTS

| | | | | |
|---|---|---|---|---|
| 3,658,343 A * | 4/1972 | Rogers | A63B 67/02 | 473/161 |
| 3,690,673 A * | 9/1972 | Occhipinti | A63B 67/02 | 473/160 |
| 3,727,917 A * | 4/1973 | MacLean | A63B 67/02 | 473/160 |
| 3,871,661 A * | 3/1975 | Korff | A63B 67/02 | 473/160 |
| 3,892,412 A * | 7/1975 | Koo | A63B 67/02 | 473/160 |
| 4,222,568 A * | 9/1980 | Russo | A63B 67/02 | 473/160 |
| 4,955,611 A * | 9/1990 | Moller | A63B 69/3661 | 273/DIG. 13 |
| 5,013,070 A * | 5/1991 | Maude, Sr. | A63B 71/0672 | 283/48.1 |
| 5,031,916 A * | 7/1991 | Boswell | A63B 69/3652 | 473/158 |
| 5,087,045 A * | 2/1992 | Kim | A63B 67/02 | 473/152 |
| 5,100,145 A * | 3/1992 | Kim | A63B 67/02 | 473/160 |
| 5,146,557 A * | 9/1992 | Yamrom | G06T 15/00 | 345/636 |
| 5,172,914 A * | 12/1992 | Primerano | A63B 69/3661 | 473/161 |
| 5,301,947 A * | 4/1994 | Kim | A63B 67/02 | 473/153 |
| 5,340,111 A * | 8/1994 | Froelich | A63B 69/3652 | 108/7 |
| 5,390,926 A * | 2/1995 | Hanson | A63B 67/02 | 473/162 |
| 5,434,789 A * | 7/1995 | Fraker | A63B 24/0021 | 473/407 |
| 5,441,265 A * | 8/1995 | Codlin | A63B 67/02 | 473/160 |
| 5,460,379 A * | 10/1995 | Cleland | A63B 69/3652 | 473/279 |
| 5,470,074 A * | 11/1995 | Hotchkiss | A63B 69/3652 | 473/279 |
| 5,527,042 A * | 6/1996 | Spriddle | A63B 69/3652 | 473/279 |
| 5,558,333 A * | 9/1996 | Kelson | A63B 71/0669 | 463/1 |
| 5,618,131 A * | 4/1997 | Weber | E01C 13/02 | 404/32 |
| 5,632,689 A * | 5/1997 | Duca | A63B 69/3623 | 473/279 |
| 5,655,971 A * | 8/1997 | Wayne | A63B 67/02 | 473/160 |
| 5,664,880 A * | 9/1997 | Johnson | A63B 71/06 | 473/131 |
| 5,683,306 A * | 11/1997 | Tait | A63B 69/3652 | 473/279 |
| 5,689,431 A * | 11/1997 | Rudow | A63B 24/0021 | 701/454 |
| 5,699,244 A * | 12/1997 | Clark, Jr. | G06F 3/033 | 701/469 |
| 5,740,077 A * | 4/1998 | Reeves | A63B 24/0021 | 463/3 |
| 5,772,534 A * | 6/1998 | Dudley | A63B 55/61 | 473/407 |
| 5,810,680 A * | 9/1998 | Lobb | A63B 57/00 | 473/407 |
| 5,820,478 A * | 10/1998 | Wood | A63B 69/3652 | 473/279 |
| 5,855,522 A * | 1/1999 | Bevan | A63B 67/02 | 473/160 |
| 5,878,369 A * | 3/1999 | Rudow | A63B 24/0021 | 701/470 |
| 5,944,615 A * | 8/1999 | Lee | A63B 69/3652 | 473/279 |
| 6,056,645 A * | 5/2000 | Servatius | A63B 67/02 | 473/161 |
| 6,146,284 A * | 11/2000 | Russell | A63B 67/02 | 473/160 |
| 6,161,809 A * | 12/2000 | Mahy | F16M 11/12 | 108/4 |
| 6,179,721 B1 * | 1/2001 | Bevan | A63B 67/02 | 473/160 |
| 6,179,724 B1 * | 1/2001 | Yang | A63B 69/3652 | 473/279 |
| 6,296,579 B1 * | 10/2001 | Robinson | A63B 57/00 | 473/407 |
| 6,338,027 B1 * | 1/2002 | Fulton | A01G 7/00 | 702/127 |
| 6,338,682 B1 * | 1/2002 | Torchia | A63B 67/02 | 473/160 |
| 6,456,938 B1 * | 9/2002 | Barnard | A63B 57/00 | 701/454 |
| 6,525,690 B2 * | 2/2003 | Rudow | A63B 24/0021 | 342/357.4 |
| 6,638,173 B2 | 10/2003 | Robinson | | |
| 6,659,881 B2 * | 12/2003 | Lee | A63B 69/3652 | 473/279 |
| 6,663,498 B2 * | 12/2003 | Stipan | A63B 69/3652 | 108/7 |
| 6,697,820 B1 * | 2/2004 | Tarlie | A63B 71/0669 | |
| 6,705,953 B2 * | 3/2004 | Haskins | A63B 69/3661 | 473/150 |
| 7,023,434 B2 * | 4/2006 | Takahashi | A63F 13/10 | 345/419 |
| 7,131,911 B2 * | 11/2006 | Kim | A63B 69/3652 | 473/279 |
| 7,713,148 B2 * | 5/2010 | Sweeney | A63B 24/0021 | 273/317 |
| 7,847,808 B2 * | 12/2010 | Cheng | A63F 13/10 | 345/632 |
| 7,942,762 B2 * | 5/2011 | Balardeta | A63B 24/0021 | 463/2 |
| RE42,439 E * | 6/2011 | Fulton | A01G 7/00 | 702/127 |
| 7,988,572 B1 * | 8/2011 | Sweeney | A63B 57/00 | 473/404 |
| 8,070,623 B2 * | 12/2011 | Stites | A63B 53/0466 | 473/329 |
| 8,070,628 B2 * | 12/2011 | Denton | A63B 57/00 | 473/407 |
| 8,162,779 B1 * | 4/2012 | Sweeney | A63B 57/00 | 473/404 |
| 8,172,702 B2 * | 5/2012 | Meadows | G06F 16/9537 | 473/407 |
| 8,303,311 B2 * | 11/2012 | Forest | G06Q 10/10 | 434/252 |
| 8,355,869 B2 * | 1/2013 | Balardeta | A63B 57/00 | 701/532 |
| 8,449,409 B1 * | 5/2013 | Barkley | G01B 11/026 | 473/404 |
| 8,636,603 B2 * | 1/2014 | Rauchholz | A63B 69/36 | 463/30 |
| 8,641,546 B2 * | 2/2014 | Rauchholz | A63B 67/02 | 463/31 |

(56) References Cited

U.S. PATENT DOCUMENTS

| | | | |
|---|---|---|---|
| 8,757,625 B2* | 6/2014 | Sweeney | A63B 24/0021 |
| | | | 273/317 |
| 8,758,170 B2* | 6/2014 | Reeves | A63B 71/0669 |
| | | | 473/406 |
| 9,283,464 B2* | 3/2016 | Nipper | A63B 24/0021 |
| 9,427,650 B2* | 8/2016 | Lee | A63B 69/3623 |
| 9,463,527 B2* | 10/2016 | Smith | B23K 20/06 |
| 9,592,437 B2* | 3/2017 | Flammer | A63B 67/02 |
| 10,166,455 B2* | 1/2019 | Flammer | A63B 67/02 |
| 2002/0089099 A1* | 7/2002 | Denning | C22B 21/0084 |
| | | | 266/229 |
| 2002/0128084 A1* | 9/2002 | Lee | A63B 57/0006 |
| | | | 473/132 |
| 2002/0196263 A1 | 12/2002 | Muramori | |
| 2003/0017890 A1* | 1/2003 | McDonald | A63B 57/00 |
| | | | 473/407 |
| 2004/0122538 A1* | 6/2004 | Gowan | A63B 71/0669 |
| | | | 700/92 |
| 2004/0147329 A1* | 7/2004 | Meadows | A63B 57/00 |
| | | | 473/131 |
| 2004/0162125 A1* | 8/2004 | Tarlie | A63B 71/0669 |
| | | | 463/3 |
| 2004/0198524 A1* | 10/2004 | Kwon | A63B 24/0021 |
| | | | 473/151 |
| 2006/0030405 A1 | 2/2006 | Robertson | |
| 2008/0018667 A1* | 1/2008 | Cheng | A63F 13/10 |
| | | | 345/632 |
| 2011/0076657 A1* | 3/2011 | Forest | G06Q 10/10 |
| | | | 434/252 |
| 2012/0053708 A1* | 3/2012 | Bonito | A63B 24/0084 |
| | | | 700/92 |
| 2013/0059277 A1* | 3/2013 | Forest | G06Q 10/10 |
| | | | 434/252 |
| 2013/0085018 A1* | 4/2013 | Jensen | A63B 57/00 |
| | | | 473/404 |
| 2013/0310201 A1* | 11/2013 | Stanley | G09B 29/006 |
| | | | 473/409 |
| 2014/0120994 A1* | 5/2014 | Song | G06Q 30/00 |
| | | | 463/4 |
| 2014/0147329 A1* | 5/2014 | Jun | C22C 38/12 |
| | | | 420/118 |
| 2018/0280781 A1* | 10/2018 | O'Connor | A63B 69/365 |
| 2018/0285491 A1* | 10/2018 | O'Connor | G06F 17/5009 |
| 2018/0345111 A1* | 12/2018 | Coffman | A63B 69/36 |

FOREIGN PATENT DOCUMENTS

| | | |
|---|---|---|
| JP | 2000-157745 A | 6/2000 |
| JP | 2006-288416 A | 10/2006 |
| JP | 2009-285453 A | 12/2009 |
| KR | 20-0274503 Y1 | 5/2002 |
| KR | 10-2010-0027344 A | 3/2010 |
| KR | 10-0970675 B1 | 7/2010 |
| KR | 10-1022503 B1 | 3/2011 |
| KR | 10-1031475 B1 | 4/2011 |
| KR | 10-2011-0058583 A | 6/2011 |
| KR | 10-1078898 B1 | 11/2011 |
| KR | 10-1079013 B1 | 11/2011 |
| WO | 2009/145407 A1 | 12/2009 |
| WO | 2011/002226 A2 | 1/2011 |
| WO | 2011/081472 A2 | 7/2011 |

OTHER PUBLICATIONS

Machine translation of KR 2011-058583 A.*
Machine translation of KR 2010-273344 A.*
Machine translation of KR 2002-74501 Y.*
Machine translation of KR 10-1079013 B.*
Machine translation of KR 10-1078898 B.*
Machine translation of KR 10-1031475 B.*
Machine translation of KR 10-1022503 B.*
Machine translation of KR 10-0970675 B.*
Machine translation of JP 2009-285453 A.*
Machine translation of JP 2006-288416 A.*
Machine translation of JP 2000-157745 A.*
Machine translation of JP H08-071194 A.*

* cited by examiner

[Fig. 1]
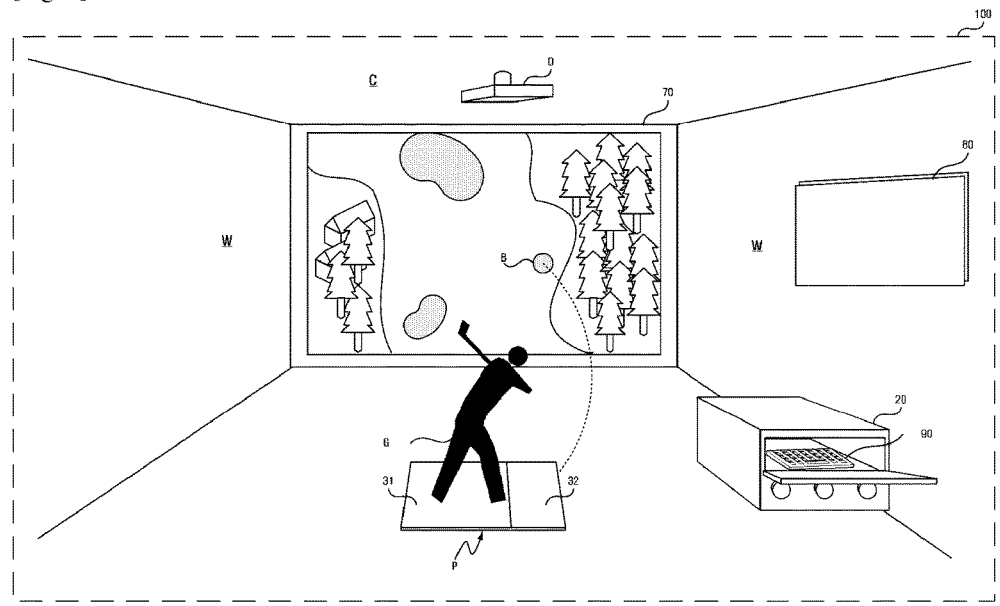
[Fig. 2]
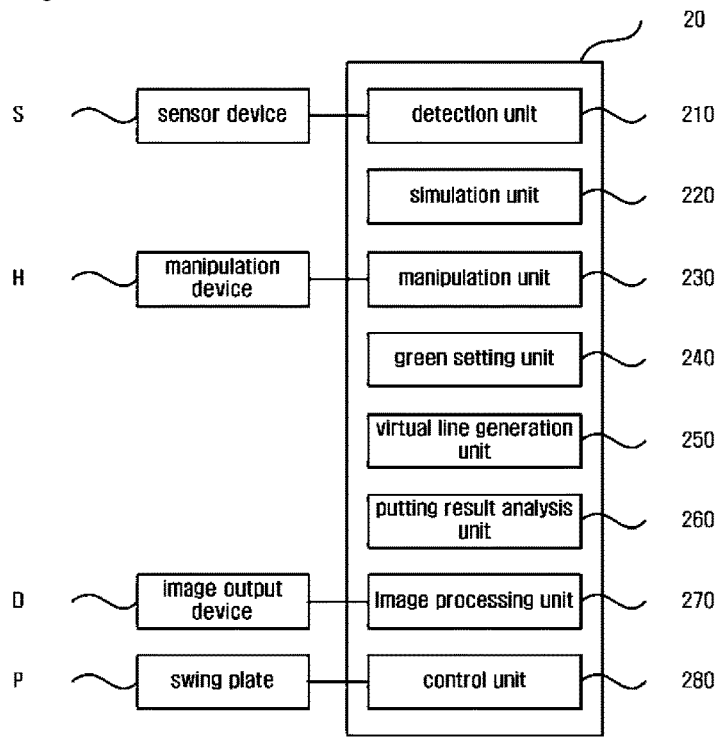

[Fig. 3]
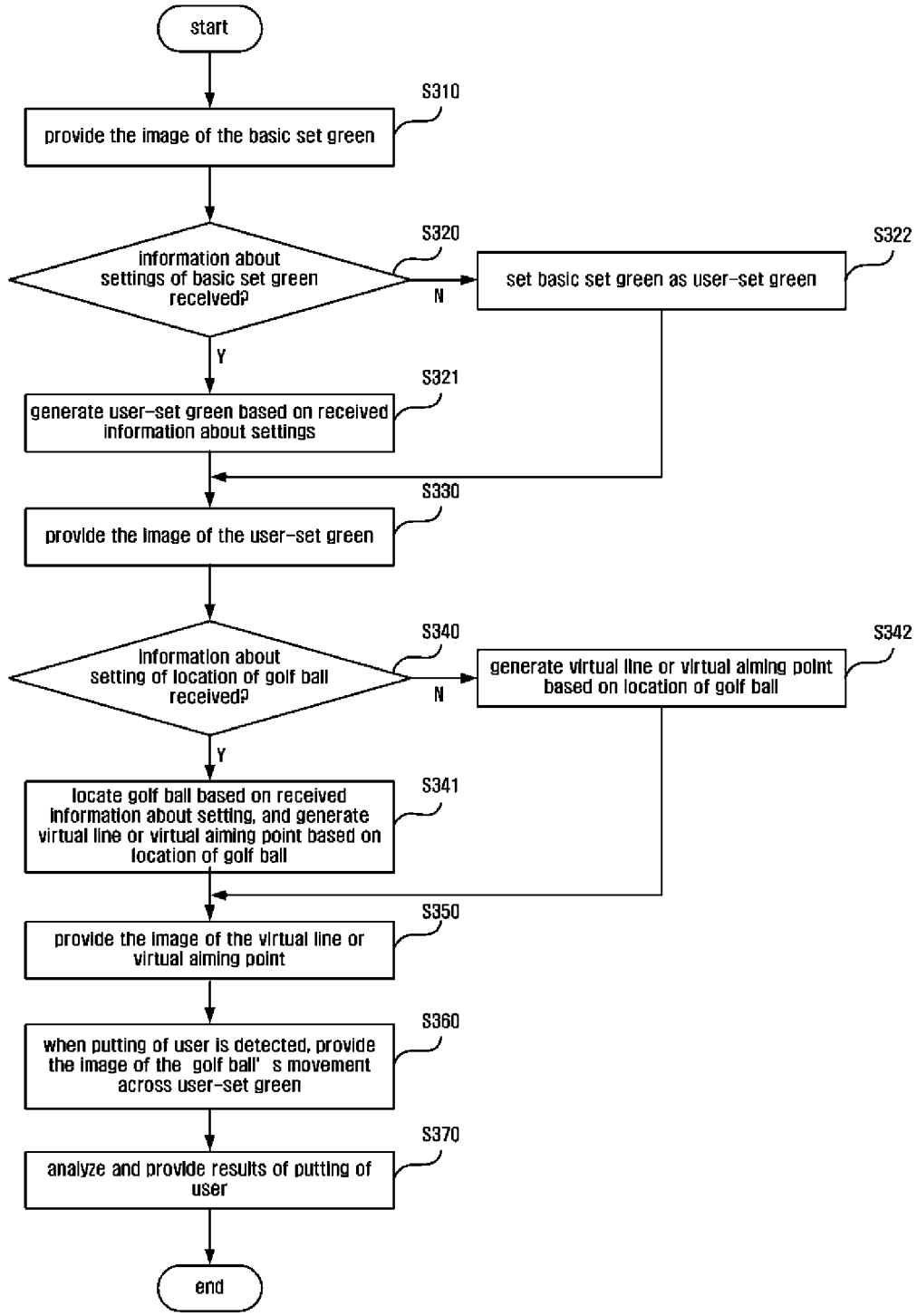

[Fig. 4]
[Fig. 5]

[Fig. 6]
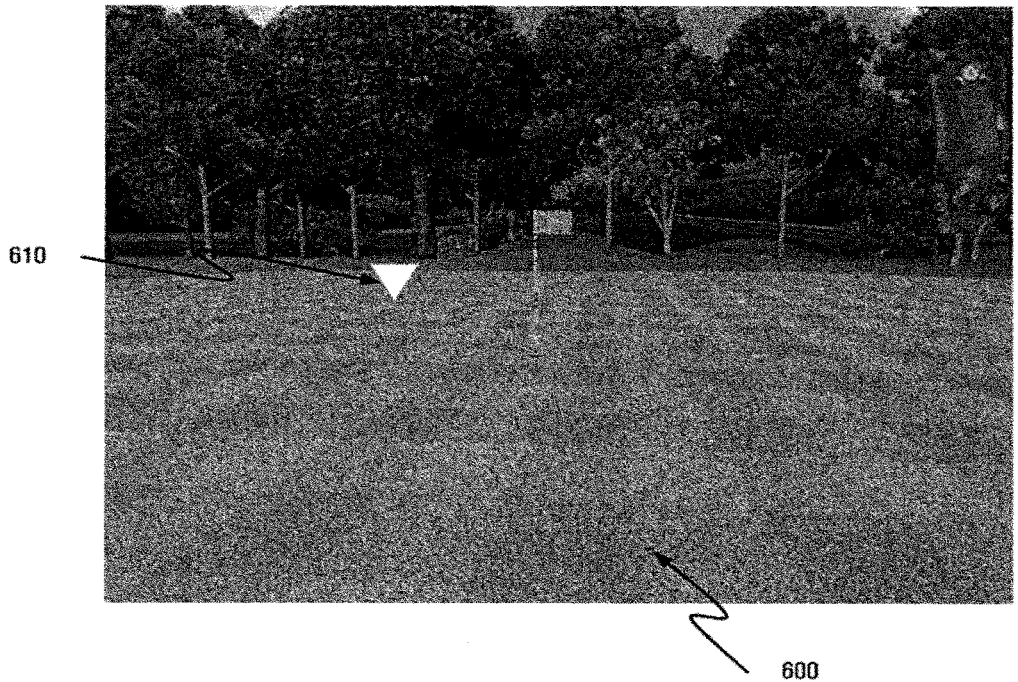
610
600
[Fig. 7]
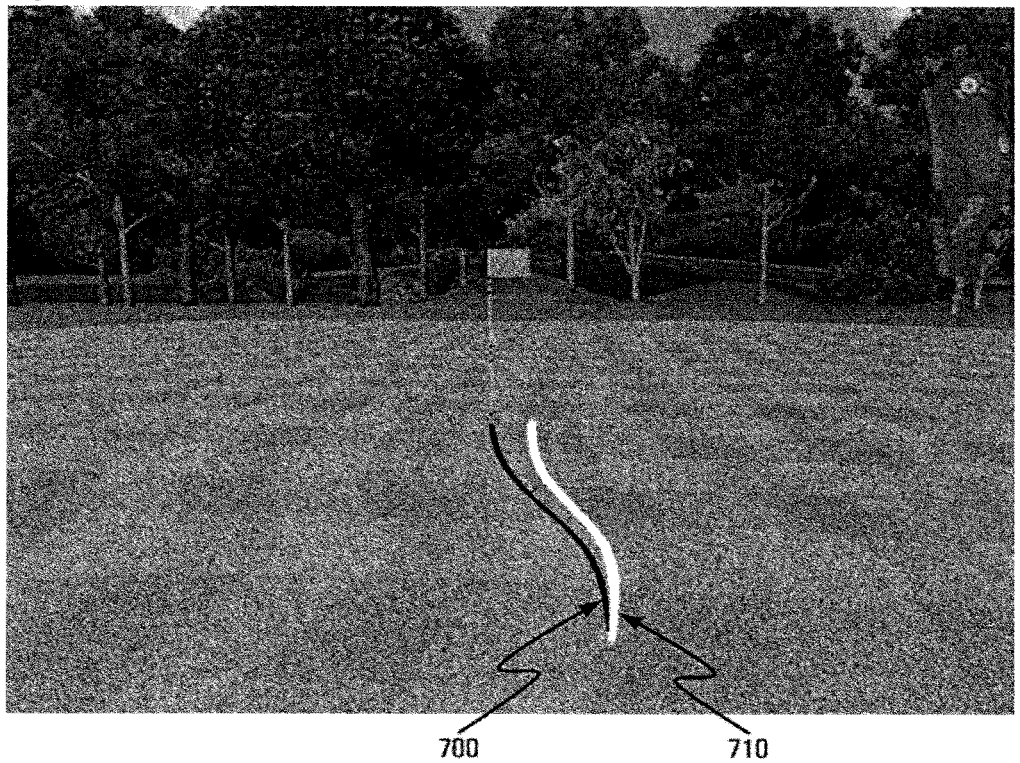
700  710

[Fig. 8]
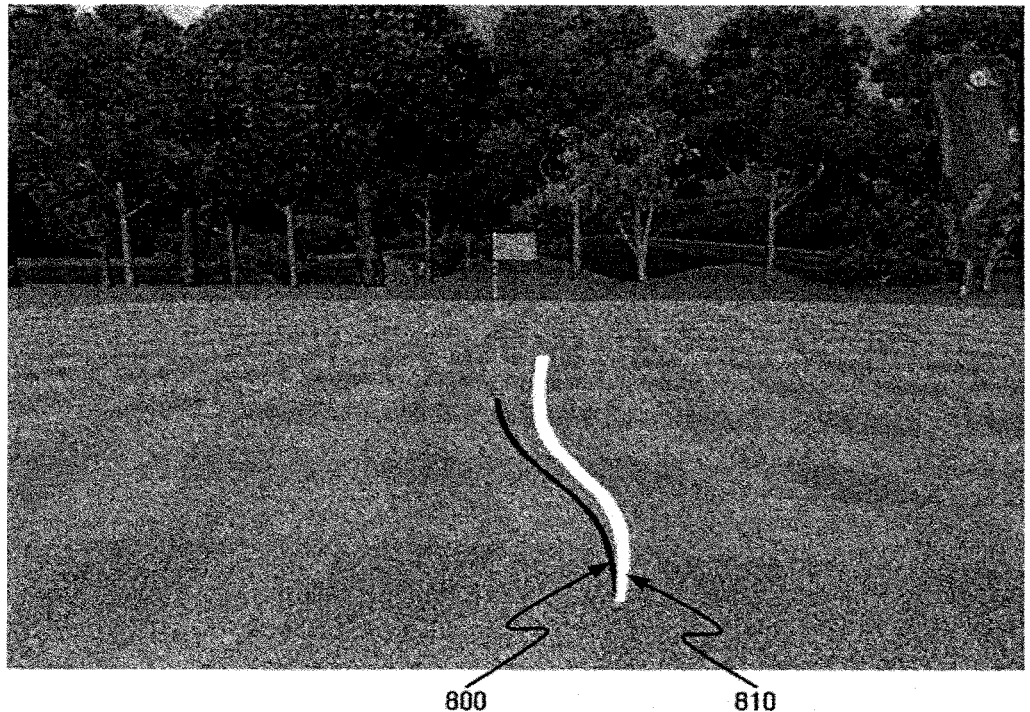
[Fig. 9]
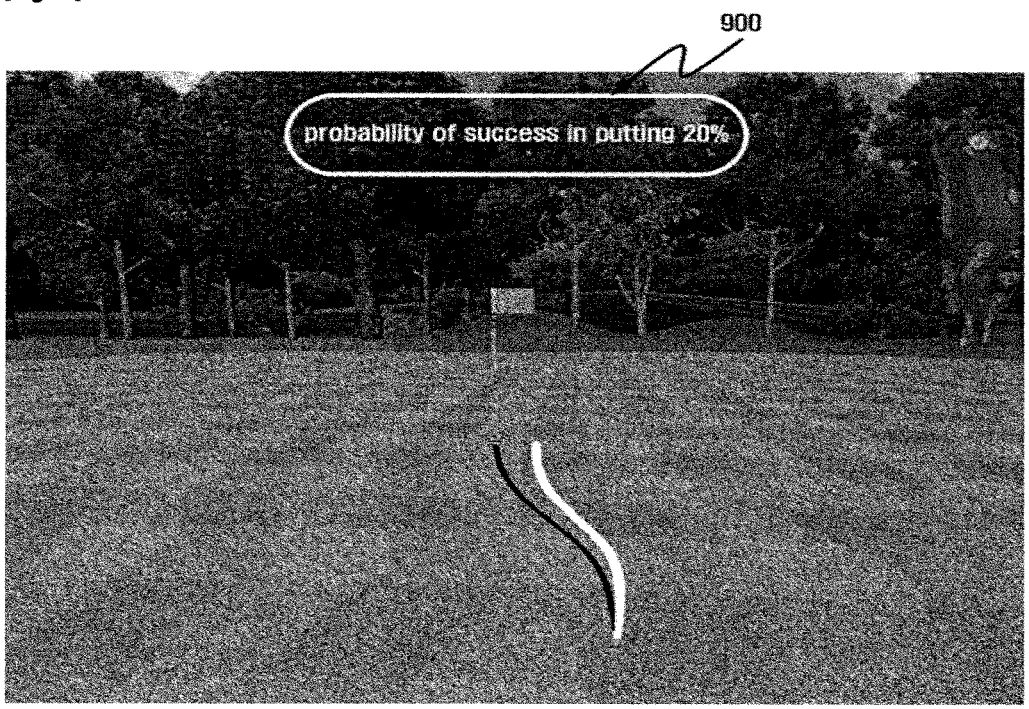

VIRTUAL GOLF SIMULATION APPARATUS AND METHOD FOR SUPPORTING GENERATION OF VIRTUAL GREEN

TECHNICAL FIELD

The present invention relates, in general, to a virtual golf simulation apparatus and method and, more particularly, to a virtual golf simulation apparatus and method that provide an interface that enables a user to generate a virtual green on which putting can be practiced.

BACKGROUND ART

As interest in golf has increased, a virtual golf simulation system that enables a user to play golf without going to a golf course has been popularized.

A virtual golf simulation system is a system that, using a virtual golf simulation apparatus, provides a virtual golf course to a user, detects the speed and direction of movement of a golf ball or a golf club when the user hits the golf ball with the golf club in the same manner that the user plays golf on an actual course, and outputs the movement of the golf ball across the virtual golf course in the form of a dynamic image or static image (hereinafter "image"). Using such virtual golf simulation systems, users can have a sense of reality that allows them to feel as if they are playing golf on an actual golf course.

Using such virtual golf simulation systems, users can practice a variety of golf shots that would normally be performed on an actual golf course. In particular, users may practice putting. The degree of difficulty of putting varies depending on the green lie of a golf course. However, conventional virtual golf simulation systems provide monotonous virtual greens regardless of the desired degree of difficulty. Therefore, there is a problem in that users cannot practice desired putting using the conventional virtual golf simulation systems.

DISCLOSURE OF INVENTION

Technical Problem

Accordingly, the present invention has been made keeping in mind the above problems occurring in the prior art, and the present invention is directed to a virtual golf simulation apparatus and method that can support the generation of a virtual green.

Furthermore, the present invention is directed to a virtual golf simulation apparatus and method that enable a user to set a virtual green on which putting can be practiced and to practice putting on the set green.

Solution to Problem

In accordance with an aspect of the present invention, there is provided a virtual golf simulation apparatus, including an image processing unit configured to provide an image of a basic set green on which a user will perform putting, a manipulation unit configured to provide an interface that enables the user to set the lie of the basic set green, and a green setting unit configured to generate a user-set green by processing received setting information via the manipulation unit, wherein the image processing unit provides the image of the user-set green.

In accordance with another aspect of the present invention, there is provided a virtual golf simulation method, including providing an image of a basic set green on which a user will perform putting, receiving information about the setting of the lie of the basic set green, generating a user-set green by processing the received information about the setting, and providing the image of the user-set green.

Advantageous Effects of Invention

In accordance with the present invention, there is provided a virtual golf simulation apparatus and method that can support the generation of a virtual green.

Furthermore, in accordance with an embodiment of the present invention, a user is enabled to directly generate a virtual green on which putting can be practiced, thereby providing a user-customized green.

Furthermore, in accordance with an embodiment of the present invention, a user is enabled to set a virtual green on which putting can be practiced and to practice putting on the set virtual green. Therefore, the user can practice putting at various degrees of difficulty.

Furthermore, in accordance with an embodiment of the present invention, the line of movement of a golf ball caused by the putting of a user is represented on a virtual green, so that the user can determine whether his or her putting is appropriate. Therefore, the user's putting ability can be improved.

Moreover, in accordance with an embodiment of the present invention, a putting instructor is enabled to set a student-customized green and to teach putting based on the set green, thereby improving the convenience of the instructor.

The advantages that can obtained from the present invention are not limited to the above-described advantages, and other advantages that have not been described above will be clearly understood from the following description by those having ordinary knowledge in the art to which the present invention pertains.

BRIEF DESCRIPTION OF DRAWINGS

The above and other objects, features and advantages of the present invention will be more clearly understood from the following detailed description taken in conjunction with the accompanying drawings, in which:

FIG. 1 is a diagram showing a virtual golf simulation apparatus in accordance with an embodiment of the present invention;

FIG. 2 is a schematic block diagram showing the simulator of the virtual golf simulation apparatus in accordance with this embodiment of the present invention;

FIG. 3 is a flowchart showing a virtual golf simulation method for supporting the generation of a virtual green in accordance with an embodiment of the present invention;

FIG. 4 is a diagram showing an example of a basic set green that is provided to a user using the virtual golf simulation apparatus and method in accordance with the embodiments of the present invention;

FIG. 5 is a diagram showing an example of a user-set green in which the degree and direction of inclination have been set for the basic set green of FIG. 4 using the virtual golf simulation apparatus and method in accordance with the embodiments of the present invention;

FIG. 6 is a diagram showing examples of a virtual line and a virtual aiming point on the user-set green of FIG. 5 generated using the virtual golf simulation apparatus and method in accordance with the embodiments of the present invention;

FIG. 7 is a diagram showing an example of a line of movement when a user performs putting on the user-set green of FIG. 5 using the virtual golf simulation apparatus and method in accordance with the embodiments of the present invention;

FIG. 8 is a diagram showing another example of the line of movement when a user performs putting on the user-set green of FIG. 5 using the virtual golf simulation apparatus and method in accordance with the embodiments of the present invention; and FIG. 9 is a diagram showing an example of the results of the analysis of putting when a user performs putting on the user-set green of FIG. 5 using the virtual golf simulation apparatus and method in accordance with the embodiments of the present invention.

MODE FOR THE INVENTION

The present invention is not limited to the following embodiments, but may be implemented in a variety of ways. The following embodiments are provided merely to make the disclosure of the present invention complete and to notify those having ordinary knowledge in the art to which the present invention pertains of the scope of the present invention. The scope of the present invention is defined only by the following claims.

Throughout the drawings, like reference symbols denote like components.

Prior to the following description, the meanings of the terms that will be used in the following description are defined below.

The term "virtual green" is a green that is obtained by implementing a green of an actual golf course in a virtual golf course. The virtual green may be a "basic set green" or a "user-set green."

The term "basic set green" refers to a green that is provided to a user by the virtual golf simulation apparatus. The user may change and set the lie of the basic set green. Here, the term "lie" refers to the state of a green on which a golf ball lies.

Furthermore, the term "user-set green" is a virtual green that is provided to the user by the virtual golf simulation apparatus after the user has changed and set the lie of the basic set green.

In connection with this, in accordance with this embodiment of the present invention, the lie of a basic set green may be changed and set by adjusting the degree or direction of inclination of the basic set green. The term "degree of inclination" refers to the height difference between the location of a golf ball and a hole cup on a virtual green, and the term "direction of inclination" refers to the direction of the inclination that starts from a location at which a golf ball lies. The degree of inclination may be, for example, a height difference of 15 cm, 30 cm or 50 cm between the location of a golf ball and a hole cup. The direction of inclination may be, for example, a slice lie in the case in which a golf ball moves to the right when rolling to a corresponding spot, a hook lie in the case in which a golf ball moves to the left when rolling to a corresponding spot, a downhill lie in the case in which a golf ball moves from a higher location to a lower location when rolling to a corresponding spot, and a uphill lie in the case in which a golf ball moves from a lower location to a higher location when rolling to a corresponding spot.

Meanwhile, the term "virtual line" refers to an imaginary line along which a golf ball is guided in a desired direction so as to achieve success in putting. That is, a virtual line is an imaginary line along which a golf ball is guided in a desired direction so as to achieve success in putting when a user putts the golf ball, and is formed in accordance with the configuration of the surface of a green. Furthermore, the term "virtual aiming point" is an imaginary point that presents a direction in which a user has to putt a golf ball in order to achieve success in putting. Here, the success in putting may mean putting a golf ball into a hole, or putting the golf ball on a spot which makes the putting as a concede putt.

The term "line of movement" refers to a line that represents a trajectory along which a golf ball has been moved by putting when a user putts a golf ball.

FIG. 1 is a diagram showing a virtual golf simulation apparatus in accordance with an embodiment of the present invention. Furthermore, FIG. 2 is a schematic block diagram showing the simulator 20 of the virtual golf simulation apparatus in accordance with this embodiment of the present invention.

The virtual golf simulation apparatus in accordance with this embodiment of the present invention will be described with reference to FIGS. 1 and 2.

The virtual golf simulation apparatus in accordance with this embodiment of the present invention detects the movement of a golf ball or a golf club that is caused by the putting of the golf ball of a user, processes the results of a simulation performed based on both the results of the detection and green environment parameters, and outputs the results of the simulation onto a screen 70 located in front of the user.

Furthermore, the virtual golf simulation apparatus in accordance with this embodiment of the present invention includes a manipulation device H that enables a user to perform manipulation to make a variety of types of settings in order to play a virtual golf game. The manipulation device H may be any type of device capable of transferring instructions of the user to the virtual golf simulation apparatus such as a touch screen, a keyboard, or a mouse.

The manipulation device H may be implemented, for example, using a keyboard 90 or a mouse, as shown in FIG. 1, using a touch screen 80 installed on a side wall W, using a remote device (not shown) that directly communicates with a simulator or a touch screen, and/or using a key manipulation unit (not shown) on a golfer section 31 so that the user can conveniently perform the settings of a virtual golf simulation on the golfer section 31.

Furthermore, the virtual golf simulation apparatus in accordance with this embodiment of the present invention includes a golfer section 31 in which the user takes a golf swing and a ball section 32 on which a golf ball B is placed. The golfer section 31 and the ball section 32 may be on a swing plate P, or may be fixedly formed on the bottom of a golf booth 100. The following description will be given on the assumption that the golfer section 31 is formed in the swing plate P. The swing plate P is operated such that the degree or direction of inclination of each of the golfer section 31 and the ball section 32 can be adjusted in accordance with the inclined surface of a virtual green that is provided to the user.

Furthermore, the virtual golf simulation apparatus in accordance with this embodiment of the present invention includes a sensor device S that detects the hitting of a golf ball of the user. The sensor device S may be implemented, for example, using an optical sensor (for instance, an IR, laser or LED sensor) installed on the user golfer section 31, or using a camera sensor installed on the ceiling C or side wall W of the golf booth 100.

Furthermore, the virtual golf simulation apparatus in accordance with this embodiment of the present invention includes an image output device D that outputs the results of the simulation of the simulator 20. For example, as shown in FIG. 1, the image output device D outputs an image of the simulation results of the user's putting onto the screen 70 that is located in front of the user G.

Furthermore, the virtual golf simulation apparatus in accordance with this embodiment of the present invention includes a simulator 20 that simulates the results of the detection of the sensor device S and displays the simulated results through the image output device D.

That is, the virtual golf simulation apparatus includes a simulator 20. As shown in FIG. 2, the simulator 20 includes a detection unit 210, a simulation unit 220, a manipulation unit 230, a green setting unit 240, a virtual line generation unit 250, a putting result analysis unit 260, an image processing unit 270, and a control unit 280. Furthermore, the simulator 20 includes a communication unit (not shown) configured to enable communication between external and internal components, and a storage unit (not shown) configured to store information necessary for the overall operation of the components.

In the virtual golf simulation apparatus in accordance with an embodiment of the present invention, when the sensor device S detects the movement of a golf ball or a golf club that is generated by the putting of the user, the detection unit 210 generates the results of the detection (for example, information about the speed, direction and height at, in and to which the golf ball has moved, or about the movement of the golf club).

In the virtual golf simulation apparatus in accordance with this embodiment of the present invention, when the simulation unit 220 acquires the results of the detection from the detection unit 210, it generates the resulting values of a simulation by simulating the results of the detection together with green environment parameters.

Here, the term "resulting values of a simulation" refers to the resulting values that are acquired by simulating the results of the detection, acquired by the putting of the user, together with green environment parameters (the parameters of information about the virtual green that are necessary for a simulation of virtual golf and that are not affected by the putting of the user, such as weather, wind, the degree of inclination of the green, the direction in which the green is inclined, green speed on a golf course, the distance between a hole cup and a tee, etc.). The resulting values of a simulation may be used when the image processing unit 270 processes an image of the movement of the golf ball on the virtual green, or when the putting result analysis unit 260 analyzes the results of the putting of the user.

Furthermore, when the simulation unit 220 acquires the results of the detection from the detection unit 210, it computes the acceleration of the putted golf ball based on the results of the detection so as to compute the strength when the golf ball was hit. The computed strength is used when the image processing unit 270 determines the thickness of the line of movement.

Meanwhile, in the virtual golf simulation apparatus in accordance with an embodiment of the present invention, the manipulation unit 230 provides an interface that enables the user to change the lie of the basic set green. For example, the manipulation unit 230 provides an interface that enables the user to set the degree of inclination or direction of inclination of the basic set green.

Furthermore, the manipulation unit 230 provides an interface that enables the user to set the green speed of the user-set green.

Furthermore, the manipulation unit 230 provides an interface that enables the user to set the location of a golf ball on the user-set green. The manipulation unit 230 may provide an interface that enables the user to set the location of a golf ball by, for example, allowing the user to locate the golf ball at a location a predetermined radius away from a hole cup on the user-set green.

Moreover, for the user's convenience, the manipulation unit 230 provides an interface that enables the user to be provided with a variety of types of degrees or directions of inclination or a plurality of locations at which a golf ball can be located and to select one from among them. The manipulation unit 230 may provide an interface that enables the user to set the direction of inclination by, for example, allowing the user to select from among a downhill lie, an uphill lie, a hook lie, and a slice lie. Furthermore, the manipulation unit 230 may provide an interface that enables the user to set the degree of inclination by, for example, allowing the user to be provided with a plurality of height differences between the location of a golf ball and a hole cup.

Furthermore, the manipulation unit 230 provides an interface that enables an automatic mode to be set. The term "automatic mode" refers to a mode that moves the location of a golf ball to another location when the golf ball located at a specific location on a user-set green is putted a predetermined number of times. Once the automatic mode has been set, the location of a golf ball on the user-set green is varied in accordance with an increase in the number of times of putting that is performed by the user, and accordingly the golf ball is placed at locations having different degrees or directions of inclination on the user-set green. That is, the user may practice putting at a variety of degrees or directions of inclination thanks to the automatic mode.

Meanwhile, in the virtual golf simulation apparatus in accordance with an embodiment of the present invention, the green setting unit 240 generates information about the user-set green in accordance with setting information received from the user. That is, once the degree or direction of inclination has been set for the basic set green by the user, information about the user-set green is generated by processing information about the basic set green and the setting information together. The information about the user-set green is used when the image processing unit 270 provides the image of the user-set green to the user, when the simulation unit 220 simulates the movement of a golf ball across the user-set green that is caused by the putting of the user, and when the virtual line generation unit 250 generates a virtual line or a virtual aiming point on the user-set green.

In the virtual golf simulation apparatus in accordance with an embodiment of the present invention, once the virtual line generation unit 250 has acquired the information about the user-set green from the green setting unit 240, it generates virtual line information, which is information about a virtual line.

Furthermore, the virtual line generation unit 250 represents the strength of putting required for a successful putt by means of the thickness of the virtual line. The thickness of the virtual line corresponding to a predetermined strength of putting is previously set by the virtual golf simulation apparatus. Accordingly, for example, when the strength of putting required for a successful putt is larger than the predetermined strength of putting, the thickness of the virtual line generated by the virtual line generation unit 250 becomes larger than the preset thickness of the virtual line generated by the virtual golf simulation apparatus. However, it is sufficient if a method of representing the strength of putting enables the user to intuitively perceive the strength of putting required for a successful putt. The method of representing the strength of putting is not limited to the method of performing representation using the thickness of the virtual line. For example, there may be a method of providing the image of the virtual line together with the numerical value of the strength of putting, or a method of varying the color of the virtual line depending on the strength of putting.

Furthermore, once the virtual line generation unit 250 has acquired the information about the user-set green from the green setting unit 240, it generates virtual aiming point information, which is information about a virtual aiming point. In some cases, the size of the virtual aiming point may represent the strength of putting that is desired for the success of the putting.

Meanwhile, the putting result analysis unit 260 analyzes the putting of the user, and then provides the results of the putting to the user.

The putting result analysis unit 260 may analyze the results of the putting by, for example, computing the ratio of the successful instances of putting to all instances of putting, and then provide the results of the analysis to the user.

Meanwhile, in the virtual golf simulation apparatus in accordance with this embodiment of the present invention, the image processing unit 270 provides the image of the basic set green via a image output device D. The basic set green may be a basic set green previously set by the virtual golf simulation apparatus, or one of user-set greens previously generated via the virtual golf simulation apparatus.

Furthermore, the image processing unit 270 provides the image of the user-set green. That is, the image processing unit 270 processes the information about the user-set green acquired from the green setting unit 240, provides the image of the process result via the image output device D.

Furthermore, the image processing unit 270 provides the image of the golf ball's movement across the user-set green that is caused by the putting of the user. That is, the image processing unit 270 processes the resulting values of the simulation acquired from the simulation unit 220 and the information about the user-set green acquired from the green setting unit 240 together, provides the image of the processed result via the image output device D. Furthermore, the image processing unit 270 provides an image of a line of movement representative of the golf ball's trajectory together with the image of the user-set green to the user.

Furthermore, the image processing unit 270 provides the image of the virtual line on the user-set green in accordance with the virtual line information acquired from the virtual line generation unit 250. The image processing unit 270 also provides the image of the virtual aiming point on the user-set green in accordance with the virtual aiming point information acquired from the virtual line generation unit 250. The image processing unit 270 additionally provides a zoom-in image obtained by dynamically enlarging the virtual line from the location of the golf ball to the hole cup.

In addition, once the image processing unit 270 has acquired the strength of the hitting of the golf ball from the simulation unit 220, the thickness of the line of movement is determined based on the strength. The thickness of the line of movement corresponding to predetermined strength is previously set by the virtual golf simulation apparatus. Accordingly, for example, if the strength acquired from the simulation unit 220 is lower than the predetermined strength, an image of a line of movement having a thickness smaller than the preset thickness is provided. However, it is sufficient if the method of representing the strength of putting enables the user to intuitively perceive the strength of putting. The method of representing the strength of putting is not limited to the method using the thickness of the line of movement. For example, there may be a method of providing the image of the virtual line together with the numerical value of the strength of putting, or a method of varying the color of the virtual line depending on the strength of putting.

Meanwhile, the control unit 280 controls the overall operation of the components of the virtual golf simulation apparatus in accordance with this embodiment of the present invention.

That is, the control unit 280 instructs the detection unit 210, the simulation unit 220, the manipulation unit 230, the green setting unit 240, the virtual line generation unit 250, the putting result analysis unit 260 and the image processing unit 270, that is, the components of the simulator 20, to operate. For example, the control unit 280 causes the image processing unit 270 to provide the image of the basic set green, causes the manipulation unit 230 to provide the interface to the user so that the user can change the lie of the basic set green, and causes the image processing unit 270 to provide the image of the user-set green based on the setting information when receiving the setting information about the basic set green via the interface. Furthermore, for example, the control unit 280 causes the virtual line generation unit 250 to generate the virtual line or virtual aiming point, and causes the image processing unit 270 to provide the image of the generated virtual line or virtual aiming point. Moreover, for example, the control unit 280 causes the simulation unit 220 to generate the resulting values of the simulation based on the putting of the user, and causes the image processing unit 270 to provide the image of the line of the golf ball's movement while providing the image of the golf ball's movement based on the resulting values of the simulation.

Furthermore, the control unit 280 adjusts the inclination of the swing plate P in accordance with the lie of the virtual green that is provided by the image processing unit 270. For example, when the image processing unit 270 provides the image of the user-set green, the control unit 280 adjusts the inclination of the swing plate P in accordance with the lie of a green on which the golf ball is located on the user-set green.

Meanwhile, FIG. 3 is a virtual golf simulation method for supporting the generation of a virtual green in accordance with an embodiment of the present invention. FIG. 3 will be described in conjunction with FIGS. 4 to 9.

In this regard, although the virtual golf simulation method of FIG. 3 will be described on the assumption that it is performed by the virtual golf simulation apparatus for ease of description, the virtual golf simulation method may be implemented in the form of a storage medium storing a program configured to perform the method and performed by any appropriate apparatus.

When the user practices putting, different putting techniques are used depending on the lie of the green, and thus the lie of the green is important. In accordance with the virtual golf simulation apparatus and method in accordance with an embodiment of the present invention, the virtual green on which the user desires to practice putting may be set by himself or herself. In this specification, for ease of description, it is assumed that the putting of the user is practiced under the condition of a hook lie.

In connection with this, the virtual golf simulation apparatus provides the image of the basic set green whose lie may be adjusted by the user at step S310.

The basic set green may be the preset basic set green that is previously set by the virtual golf simulation apparatus, or one of the user-set greens of all users who have generated the user-set greens using the virtual golf simulation apparatus.

FIG. 4 is a diagram showing an example of the basic set green that is provided to the user using the virtual golf simulation apparatus and method in accordance with the embodiments of the present invention.

When the user desires to practice putting, the virtual golf simulation apparatus provides the image of the basic set green, as shown in FIG. 4. The basic set green shown in FIG. 4 is a green that has no inclination between the golf ball and the hole cup (that is, a green that has no degree of inclination and no direction of inclination).

Meanwhile, the virtual golf simulation apparatus provides the interface that enables the user to vary and set the lie of the basic set green while providing the image of the basic set green to the user. Once the user has set the degree or direction of inclination of the basic set green via the interface at step S320, the virtual golf simulation apparatus generates the user-set green by receiving information about the settings and then processing the received information about the settings at step S321. However, if the virtual golf simulation apparatus has not received any information about settings from the user, it sets the basic set green as the user-set green at step S322.

Thereafter, the virtual golf simulation apparatus provides the image of the user-set green to the user at step S330.

FIG. 5 is a diagram showing an example of the user-set green in which the degree and direction of inclination have been set for the basic set green of FIG. 4 using the virtual golf simulation apparatus and method in accordance with the embodiments of the present invention.

The user who desires to practice putting using a hook lie sets the lie of the region spanning from the golf ball to the hole cup on the basic set green of FIG. 4 to a hook lie, as shown in FIG. 5. The virtual golf simulation apparatus processes the user-set green into which the information about the settings of the user has been incorporated, and provides the user-set green to the user.

Furthermore, the virtual golf simulation apparatus may provide the interface that enables the user to set the location of the golf ball on the user-set green while providing the image of the user-set green to the user. Once the user has set the location of the golf ball on the user-set green via the interface at step S340, the virtual golf simulation apparatus sets the location of the golf ball by receiving information about the settings and processing the received information about the settings, and generates the virtual line between the set location of the golf ball and the hole cup or the virtual aiming point at step S341. In contrast, if the virtual golf simulation apparatus has not received information about any settings from the user, it generates the virtual line between the golf ball and the hole cup or the virtual aiming point at the original location at which the golf ball is originally placed at step S342.

Thereafter, the virtual golf simulation apparatus provides the image of the generated virtual line or virtual aiming point together with the image of the user-set green to the user at step S350. In this case, the virtual golf simulation apparatus may represent the desired strength of putting by means of the thickness of the virtual line and notify the user of the desired strength. Alternatively, the virtual golf simulation apparatus may represent the desired strength of putting by means of the size of the virtual aiming point and notify the user of the desired strength.

FIG. 6 is a diagram showing examples of the virtual line and the virtual aiming point on the user-set green of FIG. 5 generated using the virtual golf simulation apparatus and method in accordance with the embodiments of the present invention.

As shown in FIG. 6, the virtual line 600 is represented on the user-set green. This enables the user to practice putting while checking the direction in which the golf ball putted by the user will be moved and desired strength.

Furthermore, as shown in FIG. 6, the virtual aiming point 610 is represented on the user-set green. This enables the user to practice putting while checking the desired direction of putting.

Meanwhile, the user may perform putting on the user-set green and the virtual golf simulation apparatus processes the resulting values of the simulation based on the putting of the user and the information about the user-set green together, and provides the results of the processing at step S360. In this case, the line of movement representative of the trajectory of the golf ball is also represented, thereby enabling the user to compare the virtual line with the line of movement.

FIG. 7 is a diagram showing an example of the line of movement when the user performs putting on the user-set green of FIG. 5 using the virtual golf simulation apparatus and method in accordance with the embodiments of the present invention.

As shown in FIG. 7, the virtual golf simulation apparatus provides the image of the line of movement 710 of the golf ball while providing the image of the golf ball's movement that is caused by the putting of the user. In some cases, the virtual line 700 is provided, thereby enabling the user to compare the results of the putting with the virtual line.

FIG. 8 is a diagram showing another example of the line of movement when the user performs putting on the user-set green of FIG. 5 using the virtual golf simulation apparatus and method in accordance with the embodiments of the present invention.

As shown in FIG. 8, the virtual golf simulation apparatus provides the image of the line of the golf ball's movement 810 while providing the image of the golf ball's movement caused by the putting of the user, and provides the image of the putting strength by varying the thickness of the line of movement in accordance with the strength of putting of the user. Furthermore, the virtual golf simulation apparatus also provides the virtual line 800, thereby enabling the user to compare the results of his or her putting with the virtual line. That is, using the virtual golf simulation apparatus, the user determines that the path of the line of movement 810 is different from that of the virtual line 800 and the thickness of the line of movement 810 is larger than that of the virtual line 800, thereby checking the necessity of adjusting the path of his or her putting and the necessity of adjusting the strength of his or her putting.

Furthermore, the virtual golf simulation apparatus may provide the results of the analysis of the putting of the user to the user at step S370.

For example, the virtual golf simulation apparatus may compute the number of successes with respect to the total number of times of putting, and provide the results of the computation to the user as the results of the analysis.

FIG. 9 is a diagram showing an example of the results of the analysis of putting when the user performs putting on the user-set green of FIG. 5 using the virtual golf simulation apparatus and method in accordance with the embodiments of the present invention.

The virtual golf simulation apparatus computes the ratio of the successes of the user and provides the results of the computation as the results of analysis 900, thereby enabling the user to check his or her ability to putt.

It is apparent to those skilled in the art that a variety of exemplary logic blocks and algorithm steps described in conjunction with the disclosed embodiments may be implemented using electronic hardware, computer software, or a combination thereof. To clarify the interchangeability between hardware and software, the various exemplary steps have been described from the point of view of their functionality. Whether the functionality will be implemented using hardware or software depends on specific application and design restrictions imposed on the overall system. Although those skilled in the art may implement the above-described functionality in a variety of ways based on respective specific applications, the determination of the implementation should not be construed as departing from the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A virtual golf simulation apparatus, comprising:
   a image processing unit configured to provide an image of a basic set green on which a user will perform putting;
   a manipulation unit configured to provide an interface that enables the user to set a lie of the basic set green by receiving setting information from the user;
   a green setting unit configured to generate a user-set green by processing the received setting information via the manipulation unit from the user;
   a detection unit configured to generate results of the detection related to at least one of movements of the golf club and the golf ball caused by the putting of the user; and
   a simulation unit configured to generate resulting values of a simulation based on results of the detection and green environment parameters;
   wherein the image processing unit provides the image of the user-set green,
   wherein the basic set green is a green that is provided by the virtual golf simulation apparatus, and the user-set green is a virtual green that is provided by the virtual golf simulation apparatus after the user has changed and set the lie of the basic set green,
   wherein the setting information includes user input for setting direction and degree of inclination of the basic set green,
   wherein the image processing unit provides the image of the golf ball's movement based on the resulting values of the simulation.

2. The virtual golf simulation apparatus of claim 1, wherein the manipulation unit provides an interface that enables the user to set at least one of a degree and direction of inclination of the basic set green.

3. The virtual golf simulation apparatus of claim 1, wherein the manipulation unit provides an interface that enables the user to set a location of the golf ball.

4. The virtual golf simulation apparatus of claim 1, further comprising a virtual line generation unit configured to generate a virtual line along which the golf ball is guided in a direction so as to perform a successful putt;
   wherein the image processing unit provides the image of the virtual line.

5. The virtual golf simulation apparatus of claim 4, wherein a thickness of the virtual line is determined based on the strength of putting desired to perform a successful putt.

6. The virtual golf simulation apparatus of claim 1, further comprising a virtual line generation unit configured to generate a virtual aiming point representative of a direction in which the user should perform putting so as to perform a successful putt;
   wherein the image processing unit provides the image of the virtual aiming point.

7. The virtual golf simulation apparatus of claim 1, wherein the image processing unit provides an image of a line of movement representative of the golf ball's trajectory.

8. The virtual golf simulation apparatus of claim 7, wherein a thickness of the line of movement is determined based on the strength of the putting of the user.

9. The virtual golf simulation apparatus of claim 1, further comprising a swing plate on which the putting of the user is performed and operation is controlled according to a lie of the user-set green.

10. A virtual golf simulation method, comprising:
    providing an image of a basic set green on which a user will perform putting;
    receiving, from the user, information about a setting of a lie of the basic set green;
    generating a user-set green by processing the received information about the setting;
    providing the image of the user-set green;
    generating results of detection of at least one of movements of the golf club and the golf ball caused by the putting of the user;
    generating resulting values of a simulation based on the results of the detection and green environment parameters; and
    providing the image of the golf ball's movement based on the resulting values of the simulation,
    wherein the basic set green is a green that is provided by the virtual golf simulation apparatus, and the user-set green is a virtual green that is provided by the virtual golf simulation apparatus after the user has changed and set the lie of the basic set green, and
    wherein the received information includes user input for setting direction and degree of inclination of the basic set green.

11. The virtual golf simulation method of claim 10, wherein the setting of the lie of the basic set green comprises a setting of at least one of a degree and direction of inclination of the basic set green.

12. The virtual golf simulation method of claim 10, further comprising receiving a setting of a location of a golf ball.

13. The virtual golf simulation method of claim 10, further comprising providing an image of a virtual line along which the golf ball is guided in a direction so as to achieve success in putting.

14. The virtual golf simulation method of claim 13, wherein a thickness of the virtual line is determined based on a strength of putting required to perform a successful putt.

15. The virtual golf simulation method of claim 10, further comprising providing an image of a virtual aiming point representative of a direction in which the user should perform putting so as to perform a successful putt.

16. The virtual golf simulation method of claim 10, wherein providing the image of the golf ball's movement comprises providing an image of a line of movement representative of the golf ball's trajectory.

17. The virtual golf simulation method of claim 16, wherein a thickness of the line of movement is determined based on a strength of the putting of the user.

18. The virtual golf simulation method of claim 10, further comprising providing results of analysis obtained by analyzing the resulting values of the simulation.

* * * * *